(12) United States Patent
Reed et al.

(10) Patent No.: US 7,725,440 B2
(45) Date of Patent: May 25, 2010

(54) RESTORING A DATABASE USING FUZZY SNAPSHOT TECHNIQUES

(75) Inventors: Benjamin C. Reed, Morgan Hill, CA (US); Philip Bohannon, Cupertino, CA (US)

(73) Assignee: Yahoo! Inc., Sunnyvale, CA (US)

( * ) Notice: Subject to any disclaimer, the term of this patent is extended or adjusted under 35 U.S.C. 154(b) by 323 days.

(21) Appl. No.: 11/862,025

(22) Filed: Sep. 26, 2007

(65) Prior Publication Data

US 2009/0083339 A1  Mar. 26, 2009

(51) Int. Cl.
*G06F 17/00* (2006.01)
*G06F 7/00* (2006.01)
*G06F 17/30* (2006.01)

(52) U.S. Cl. .................. 707/674; 707/703; 707/661; 707/640

(58) Field of Classification Search .............. None
See application file for complete search history.

(56) References Cited

U.S. PATENT DOCUMENTS

| RE37,601 E | * | 3/2002 | Eastridge et al. ............... 714/6 |
| 7,233,947 B2 | * | 6/2007 | Lomet ............................ 707/8 |
| 7,533,138 B1 | * | 5/2009 | Martin ........................ 707/206 |
| 2004/0260726 A1 | * | 12/2004 | Hrle et al. ................. 707/104.1 |

* cited by examiner

*Primary Examiner*—Uyen T. Le
(74) *Attorney, Agent, or Firm*—Stattler-Suh PC

(57) ABSTRACT

A method and device are provided for taking a database snapshot using a fuzzy snapshot. In one example, the method includes starting and maintaining a transaction log of the database, starting and maintaining a fuzzy snapshot of the database without applying any hindering locks to the database, and restoring the database by applying the transaction log to the fuzzy snapshot.

21 Claims, 4 Drawing Sheets

RESTORING A DATABASE USING FUZZY SNAPSHOT TECHNIQUES

FIELD OF THE INVENTION

The present invention relates to database snapshots. More particularly, the present invention relates to database snapshots of a main memory database without using hindering locks on the database.

BACKGROUND OF THE INVENTION

Main memory database systems maintain a simple but potentially large, in-memory data structure that holds the data of the database. This type of database is typically between about 1 Gigabyte and about 4 Gigabytes in size, and cannot be larger than the memory of the particular computer because the database is in-memory. The memory utilized is standard RAM in standard servers.

in order to be able to recover such a database after a crash, the database maintenance system needs to ensure that all the information contained in memory is also on disk as a backup. Accordingly, the database maintenance system logs updates to the database. In other words, every time a change happens to the database, the database maintenance system logs the change into the log. When the database is restarted, the database maintenance replays the log. As can be imagined, after a relatively short time, the log can grow to be extremely long. Every time the database is rebooted, the database start time is longer than the previous reboot as the log grows.

To address this problem, the database maintenance software periodically takes snapshots of the database in order to reduce the recovery time when the database needs to be restarted. For example, after every 10,000 transactions or so, the database maintenance takes a snapshot of the database. After each snapshot, the database maintenance software starts a new log. Otherwise, without the snapshots, the database log would grow without bounds and the startup time would be proportional to the size of the database log. Using this snapshot method, when the database maintenance system needs to do a recovery, the system returns to the last snapshot and applies the log entries. The database maintenance system may thereby quickly recover a database. Continuing with the example above, at most, the database maintenance system has to restore a snapshot and replay 10,000 transactions.

Unfortunately, in order to take a snapshot, the database maintenance system must lock the database, write the entire database onto disk and unlock the database in order to start updating the database again. Meanwhile, real world implementations of databases are relatively large. Accordingly, as the database grows, it takes longer and longer to snapshot. So, the time to take a snapshot is much higher than the minimum request latency of updates to the database. For example, a database over about one Gigabyte requires a time for a lock that is too long for practical implementations of the database. For this reason, the database maintenance system cannot lock the database to take a snapshot of the database.

To address these problems, a proposed solution is to use some form of copy-on-write or partial locks. Copy-on-write is an optimization strategy used in computer programming. The fundamental idea is that if multiple callers ask for resources which are initially indistinguishable, you can give them pointers to the same resource. This fiction can be maintained until a caller tries to modify its "copy" of the resource, at which point a true private copy is created to prevent the changes becoming visible to everyone else. All of this happens transparently to the callers. The primary advantage is that if a caller never makes any modifications, no private copy need ever be created. A database maintenance system uses the copy-on-write concept hi maintenance of instant snapshots on database servers like Microsoft® SQL Server® 2005. As discussed above, instant snapshots preserve a static view of a database by storing a pre-modification copy of data when underlying data is updated.

Unfortunately, copy-on-write complicates certain implementations of database maintenance software. Also, partial locks still introduce unwanted latencies.

SUMMARY OF THE INVENTION

What is needed is an improved method having features for addressing the problems mentioned above and new features not yet discussed. Broadly speaking, the present invention fills these needs by providing a method and system of taking a database snapshot using a fuzzy snapshot. It should be appreciated that the present invention can be implemented in numerous ways, including as a method, a process, an apparatus, a system or a device. Inventive embodiments of the present invention are summarized below.

In one embodiment, a method of taking a snapshot, of a database is provided. The method comprises starting and maintaining a transaction log of the database, starting and maintaining a fuzzy snapshot of the database without applying any hindering locks to the database, and restoring the database by applying the transaction log to the fuzzy snapshot.

In another embodiment, a database snapshot device comprises a transaction log device configured to start and maintain a transaction log of the database, and a fuzzy snapshot device configured to start and maintain a fuzzy snapshot of the database without applying any hindering locks to the database, wherein the database snapshot device is configured to restore the database by applying the transaction log to the fuzzy snapshot.

In still another embodiment, a computer readable medium carrying one or more instructions for taking a snapshot of a database is provided, wherein the one or more instructions, when executed by one or more processors, cause the one or more processors to perform the steps of starting and maintaining a transaction log of the database, starting and maintain a fuzzy snapshot of the database without applying any hindering locks to the database, and restoring the database by applying the transaction log to the fuzzy snapshot.

The invention encompasses other embodiments configured as set forth above and with other features and alternatives.

BRIEF DESCRIPTION OF THE DRAWINGS

The present invention will be readily understood by the following detailed description in conjunction, with the accompanying drawings. To facilitate this description, like reference numerals designate like structural elements.

DETAILED DESCRIPTION

An invention for taking a database snapshot using a fuzzy snapshot is disclosed. Numerous specific details are set forth in order to provide a thorough understanding of the present invention. It will be understood, however, to one skilled in the art, that the present invention may be practiced with other specific details.

Figure 2:
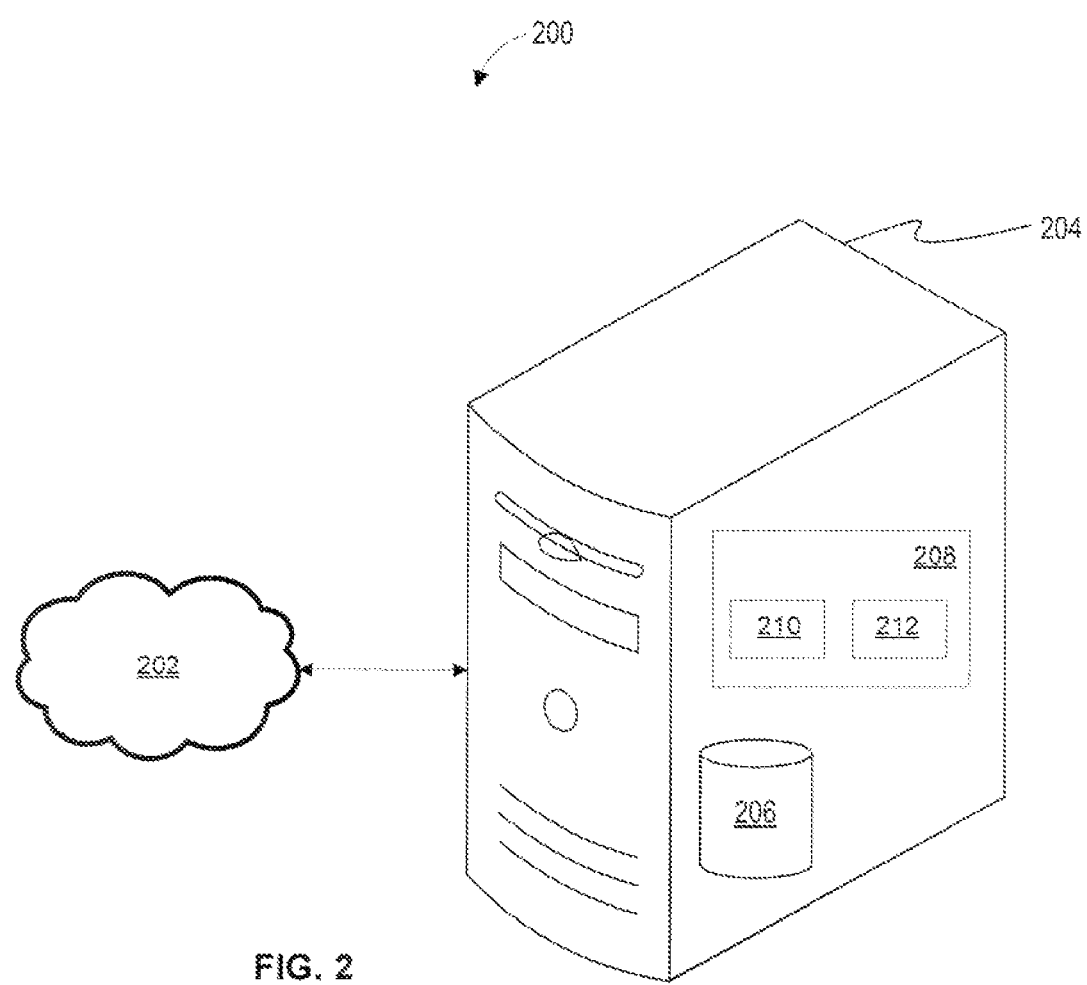
FIG. 2 is a high-level, view of a database snapshot system, in accordance with an embodiment of the present invention.

FIG. 2 is a high-level view of a database snapshot system 200, in accordance with an embodiment of the present invention. The database snapshot system 200 includes a server 204 coupled to a network 202, which may include the Internet, a local area network (LAN), wide area network (WAN) or other type of network. The server 204 includes a database 206 and a database snapshot device 208. The database snapshot device 208 includes a transaction log device 210 and a fuzzy snapshot device 212. Generally, a device is software, hardware or a combination thereof. FIG. 2 shows the database snapshot device 208 inside the server 204. However, the database snapshot device 208 does not have to be located inside the server 204. There are alternative locations for the database snapshot device 208. For example, the database snapshot device 208 may be located on another networked computer in the database snapshot system 200.

Rather than locking the database and taking a static snapshot of the database 206, the database snapshot device 208 starts a snapshot that serializes (or processes) the database 206 while the database 206 is being updated. Since the database snapshot device 208 does not lock the database 206, the end result is a fuzzy snapshot that consists of the database 206 at the start of the snapshot with some subset of the updates that occurred to the database 206 while the snapshot was in process. Thus, the database snapshot device 208 addresses lack of control over memory management by exploiting a tree data model of the fuzzy snapshot and the idempotent nature of the updates to the database 206.

The database snapshot device 208 maintains a transaction log in a conventional manner. Also, the database snapshot device 208 initiates a snapshot in a conventional manner. For example, after about 10,000 transactions, the database snapshot device 208 starts a snapshot. However, the database snapshot device 208 does not apply any hindering locks to the database 206. A hindering lock is a lock that slows down the database, such as a global lock or a regional lock on a substantial part of the database.

Accordingly, the database snapshot device 208 has started a thread that is taking a snapshot of the database 206. However, as the database snapshot device 208 is taking the snapshot, transactions are coming into the database 206. The database 206 is dynamic and is constantly changing during the snapshot. The only thing in the database 206 that the database snapshot device 208 actually locks is each individual entry into the database 206 as the database snapshot device 208 processes that entry. The database snapshot device 208 goes through the database 206 and continuously writes new database entries. Writing out an entry is extremely fast because the size of an entry is on the order of kilobytes. Thus, the database snapshot device 208 does not need to take out any hindering locks.

The database snapshot device 208 may then start writing the database 206 to disk for future restoring. If the database snapshot device 208 goes to writing particular data out that has been deleted, then the database snapshot device 208 skips that particular data and continues the writing process. When this snapshot process is finished, the disk contains the fuzzy snapshot, which is an extremely fuzzy state of the database 206.

At this point, on the disk is the database 206 with which the database snapshot device 208 started at the start of the snapshot plus some random set of transactions that came in between the start and the end of the snapshot applied. The disk contains what looks like, to the untrained eye, a random mess. A number of the entries are valid. However, some of the entries are invalid. For example, the database snapshot device 208 may have written to disk some entries that were changed before the snapshot is finished. Also, there may be other entries that were not at a particular place when the database snapshot device 208 started writing the snapshot. However, by the time the database snapshot device 208 started that particular place in the dataset, the server 204 created these other entries. So, the database snapshot device serializes these new entries. The resulting fuzzy snapshot is a seemingly random mix of data, including data that was in the database 206 at the beginning of the snapshot and data changes made during the snapshot.

An important part here is using the fuzzy snapshot during recovery of the database. The database snapshot device 208 has the fuzzy snapshot in memory. The fuzzy snapshot may not look like any database 206 that was ever present at any particular time because the fuzzy snapshot contains the mix of old and new data. The database snapshot device 208 takes the set of transactions (or transaction log) that the database snapshot device 208 received since the beginning of the snapshot and applies that set of transactions to the fuzzy snapshot in memory.

When the database snapshot device 208 applies these transactions, the database snapshot device 208 skips any errors. For example, the database snapshot device 208 may come across a transaction in the log that indicates "set the row ABC to the value 123"; the database snapshot device 208 goes to do the set and finds there is no row ABC; thus, the set fails. In other words, this example presents an error. In such an example, the database snapshot device 208 ignores the error. The database snapshot device ignores any errors.

Interestingly, once the database snapshot device 208 applies the full set of transactions in the transaction log to the fuzzy snapshot, the end result is a valid database. The resulting database is the database that was in memory at the time of the last transaction in the transaction log.

This process works because the operations in the log have an idempotent property. In fact, order for process to work properly, the transactions applied to the database and put into the log must be idempotent. In other words, the database snapshot device 208 can apply a particular transaction more than once, and the result of the applied transaction will be the same. For example, if the command "set the row ABC to the value 123" is applied twice, the result will be the same; in other words. Row ABC will contain 123, even though the database snapshot device 208 applied the transaction twice. In another example, if the database snapshot device deletes particular data, that particular data is gone; if the database snapshot device 208 deletes that particular data again, there will be an error, but that particular data will still be gone. In yet another example, if the database snapshot device creates particular data, the particular data is now there; if the database snapshot device 208 creates that particular data again, there will be an error, but the particular data will be there from the first create command.

The examples discussed above illustrate the basic commands (set, delete and create) that the database snapshot device 208 applies to the fuzzy snapshot using the transaction, log. Because the transactions are idempotent, the database snapshot device 208 can apply the transactions to the fuzzy snapshot multiple times and still end up with the same result. The database snapshot device 208 will simply replace any transaction in the fuzzy snapshot that occurred after the start of the snapshot. Note that the database snapshot device 208 may apply a given transaction multiple times because the database snapshot device 208 simply applies transactions according to the transaction log. Accordingly, no transactions are missed. It is just that because of the fuzzy nature of the fuzzy snapshot, the database snapshot device 208 may end up applying any particular transaction more than once. However, that is acceptable because the transactions are idempotent.

Here are more examples of how the fuzzy snapshot of the database works. The database snapshot device 208 starts a fuzzy snapshot. Then, a create command comes in. If the entry created is processed accordingly by the snapshot thread, the result is a fuzzy snapshot without that create command. However, the transaction log has the create command. When the database snapshot device 208 restores the database and applies that create command according to the transaction log, the database will have the correct form with respect to that create command.

Potentially what can happen is that the database snapshot device 208 starts a snapshot Then, a create command happens. Then, a set command happens. Then, a delete command happens. If the snapshot thread happens to process that part of the database before any of these commands happen, it will be like the snapshot was done synchronously. In other words, upon restoring the database into memory* no entry would be there in the fuzzy snapshot. However, the transaction log contains the create, set and delete commands, and everything restores synchronously. Upon applying the transaction log to the fuzzy snapshot, the create, set and delete commands occur synchronously as planned.

Alternatively, the database snapshot device 208 happens to process that part of the database after the create command happens but before the set and delete commands. Upon restoring the database into memory, the create entry from the create command will already have affected that part of the fuzzy snapshot. Also, the transaction log contains the create, set and delete commands. Upon applying the transaction log to the fuzzy snapshot, the create command from the transaction, log will create an error, and that is fine. The database snapshot device 208 will simply skip that create command because the entry created is already there in the restored database. Then, the database snapshot device 208 applies the set command. The set command will work because the entry is there. Then, the database snapshot device applies the delete command. The delete command will work because the entry is there and modified by the set command.

Alternatively, the database snapshot device 208 happens to process that part of the database after the create and set commands happen but before the delete command happens. Upon restoring the database into memory, the create entry from the create and set commands will already have affected that part of the fuzzy snapshot. Also, the transaction log contains the create, set and delete commands. Upon applying the transaction log to the fuzzy snapshot, the create and set commands from the transaction log will create errors, and that is fine. The database snapshot device 208 will simply skip those create and set commands because the modified entry is already there in the restored database. Then, the database snapshot device applies the delete command. The delete command will work because the entry is there and modified by the set command.

Alternatively, the database snapshot device 208 happens to process that part of the database after the create, set and delete commands happen. Upon restoring the database into memory, nothing is there with respect to that part of the database because the delete command took the entry away. Accordingly, the create, set and delete commands will have already affected that part of the fuzzy snapshot. Also, the transaction log contains the create, set and delete commands. Upon applying the transaction log to the fuzzy snapshot, the database recovery device 208 will apply the create, set and delete commands because no entry is there to return an error. In this example, after the database recover device 208 applies the delete command, the end result will correctly be no entry.

Figure 1:
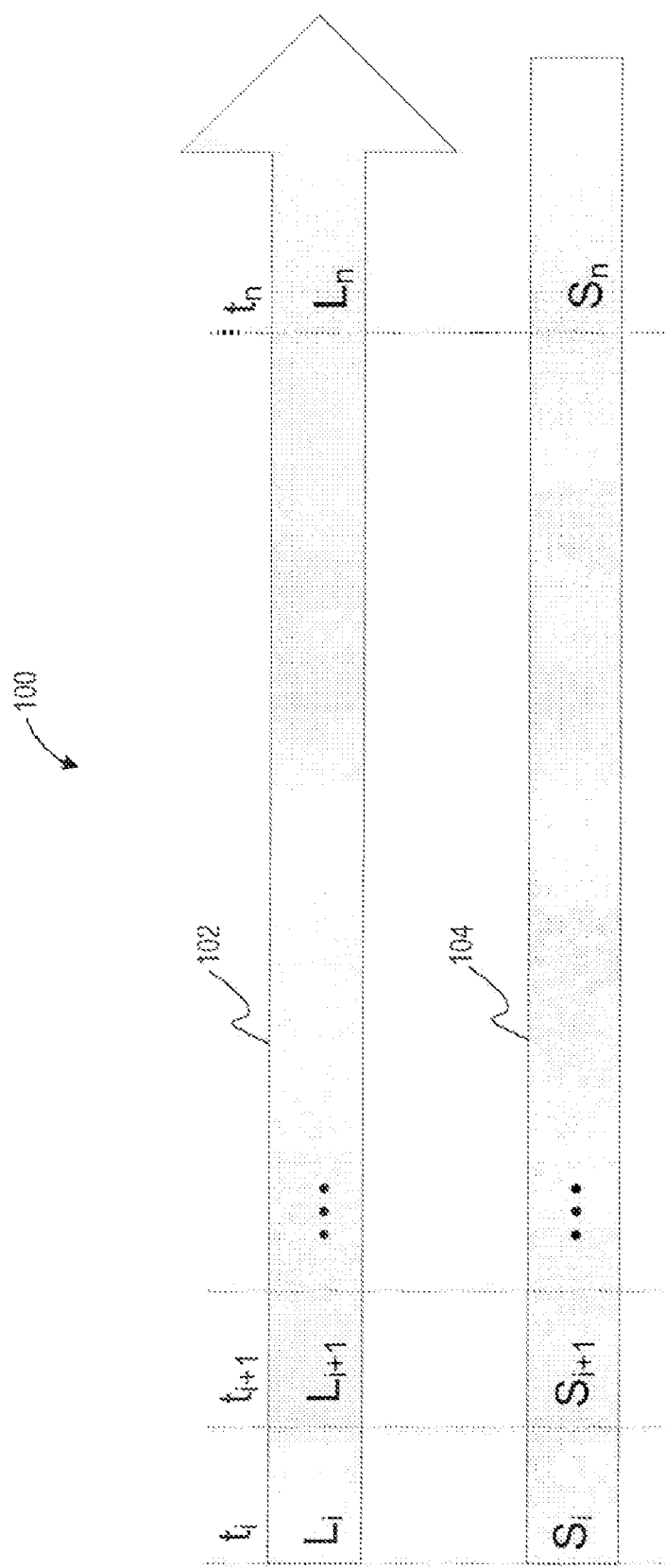
FIG. 1 is a schematic diagram of a database snapshot device, in according with an embodiment of the present invention.

FIG. 1 is a schematic diagram 100 of a database snapshot device, in accordance with an embodiment of the present invention. The schematic diagram shows the relationship between the transactions log 102 and the fuzzy database 104. In short, the database at the nth transaction is equal to the database at the ith transaction plus all the transactions from i+1 to n applied to the database at the ith transaction.

$S_i$ is the database at any transaction $t_i$, which is the ith transaction and is the start of the snapshot. $L_i$ is the transaction log started at transaction $t_i$. $S_{i+1}$ is the database at transaction $t_{i+1}$, which is the i+1th transaction and indicates i+1 transactions (or updates) occurred. $L_{i+1}$ is the transaction log started at transaction $t_{i+j}$. $S_n$ is the database at transaction $t_n$, which is the nth transaction and indicates n transactions (or updates) occurred. $L_n$ is the transaction log that contains the transactions from transaction $t_i$ to transaction $t_n$. We define $S'_n$ to be the snapshot that began with $S_i$ and ended before $S_n$. $L'_n$ contains the transactions of $L_n$ that are captured during $S'_n$.

Whenever the method for taking fuzzy snapshot is restarted, the database snapshot device has $S'_n$ and the transaction log $L_n$. However, the database snapshot device needs to get $S_n$ to make sure the database snapshot, device starts where the database snapshot device left off.

If the database snapshot device defines $L'_n$ to be the transactions captured in $S'_n$ during the snapshot, then $S'_n = S_n + L'_n$, where + indicates the transactions in $L'_n$ are applied to $S_n$. $L'_n$ is a subset of $L_n$ because $L_n$ has all the transactions applied since $S_i$. Observe that $S'_n + L_n = S_n + L'_n + L_n$. Due to the idempotent nature of the transactions, $L'_n + L_n = L_n$. Thus, $S_n = S'_n + L_n$.

To recover the database, the database snapshot device takes the fuzzy snapshot $S'_n$ and applies the update log $L_n$ to $S'_n$. Whenever the database snapshot device applies $L_n$, the database snapshot device ignores any errors that would result from applying the transaction more than one time.

Figure 3:
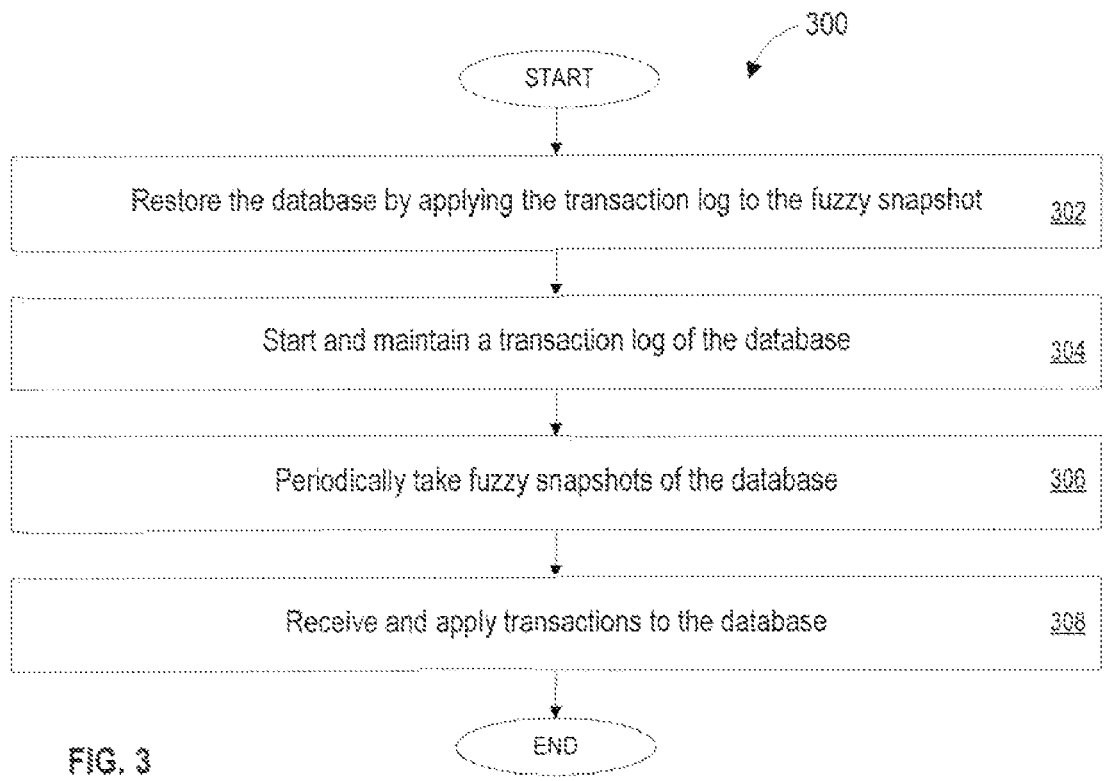
FIG. 3 is flowchart of a method of taking a snapshot and restoring a database, in accordance with an embodiment of the present invention.

FIG. 3 is flowchart of a method 300 of taking a snapshot and restoring a database, in accordance with an embodiment of the present invention. The method starts in step 302 where the database snapshot device restores the database by applying the most current transaction log to the most current fuzzy snapshot. This step is skipped if this happens to be the first time this method 300 is applied to the database.

An important purpose of the transaction log and fuzzy snapshot is to get the transactions to non-volatile storage. Accordingly, the method 300 continues to step 304 where the database snapshot device starts and maintains a transaction log of the database. This starting and maintaining involves writing the transaction log to the transaction log device. Shortly thereafter or simultaneously, in step 306, the database snapshot device periodically takes fuzzy snapshots of the database. Taking a fuzzy snapshot involves writing a fuzzy snapshot to the fuzzy snapshot device. In other words, the fuzzy snapshot begins serializing (or processing) the database without applying any hindering locks to the database. Then, in step 308, the database snapshot device receives and applies transactions to the database. Because of the idempotent nature of the transactions, the database snapshot device may apply the same transaction multiple times to the fuzzy snapshot and still end with the same restored database.

The steps of the method 300 continue as appropriate. The database stays in the ready state of this method 300 until the database is shutdown. The method 300 is then at an end.

Figure 4:
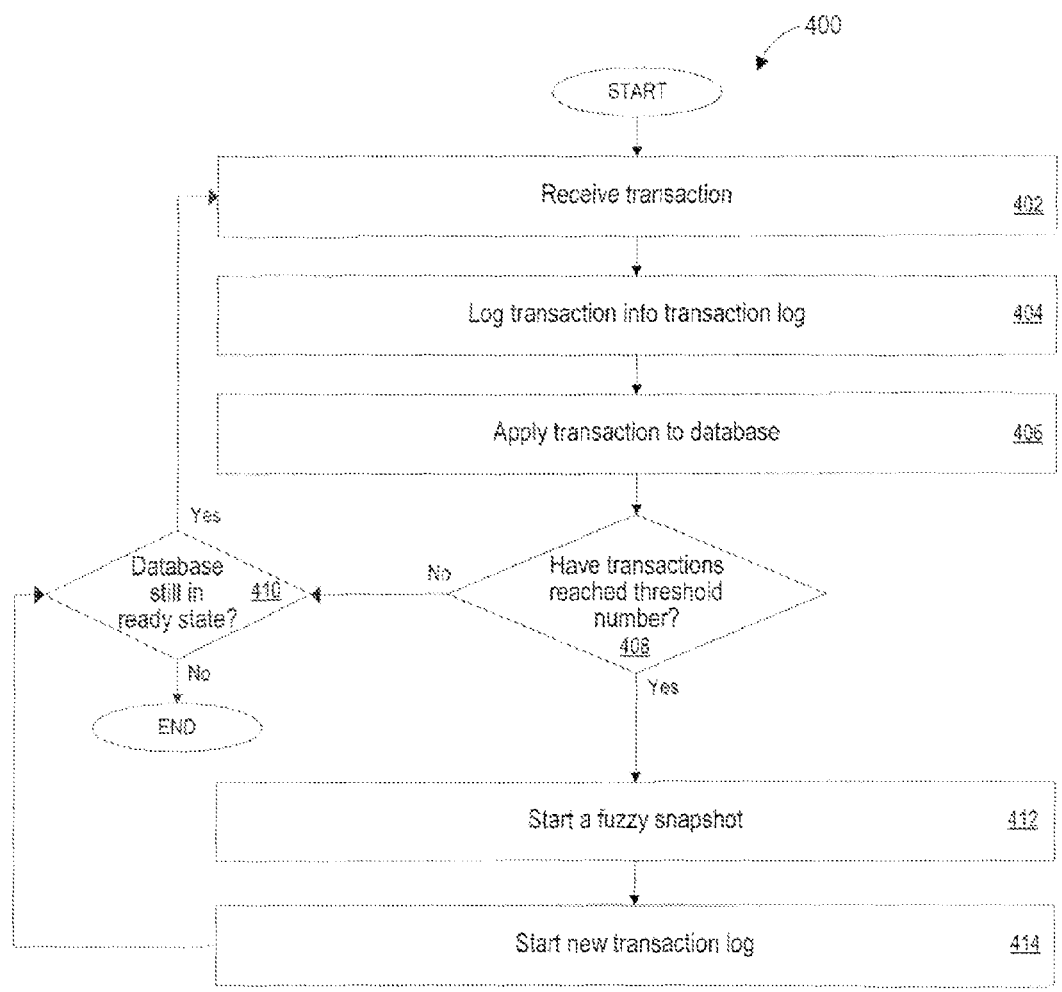
FIG. 4 is a flowchart of a method of taking a snapshot of a database, in accordance with an embodiment of the present invention.

FIG. 4 is a flowchart of a method 400 of taking a snapshot of a database, in accordance with an embodiment of the present invention. The method 400 starts in step 402 where the database snapshot device receives a transaction. Next, in step 404, the database snapshot device logs the transaction into a transaction log. In other words, the database snapshot device writes the transaction log, including the transaction, to the transaction log device. Then, in step 406, the database snapshot device applies the transaction to the database.

The method 400 then continues to decision operation 408 where the database snapshot device determines if the number of transactions in the transaction log has reached a threshold number of transactions. This threshold number could be 10,000 transactions for example. If the number of transactions in the log has not reached the threshold number, the method 400 moves to decision operation 410. In decision operation 410, if the database is still in the ready state, the method 400 returns to step 402 where the database snapshot device receives another transaction and the method 400 continues. Decision operation 410 actually applies to the database constantly but is placed where it is in the method 400 for simplicity.

If the number of transactions has reached the threshold number, the method 400 proceeds to step 412 where database snapshot device starts a fuzzy snapshot. Next or simultaneously, in step 414, the database snapshot device starts a new transaction log. Without waiting for the fuzzy snapshot to complete, the method 400 moves to decision operation 410 where it is determined if the database is still in the ready state. If so, the method 400 returns to step 402 where the database snapshot device receives another transaction and the method 400 continues. However, if it is determined in decision operation 410 that the database is not in the ready state, the method 400 is at an end.

Figure 5:
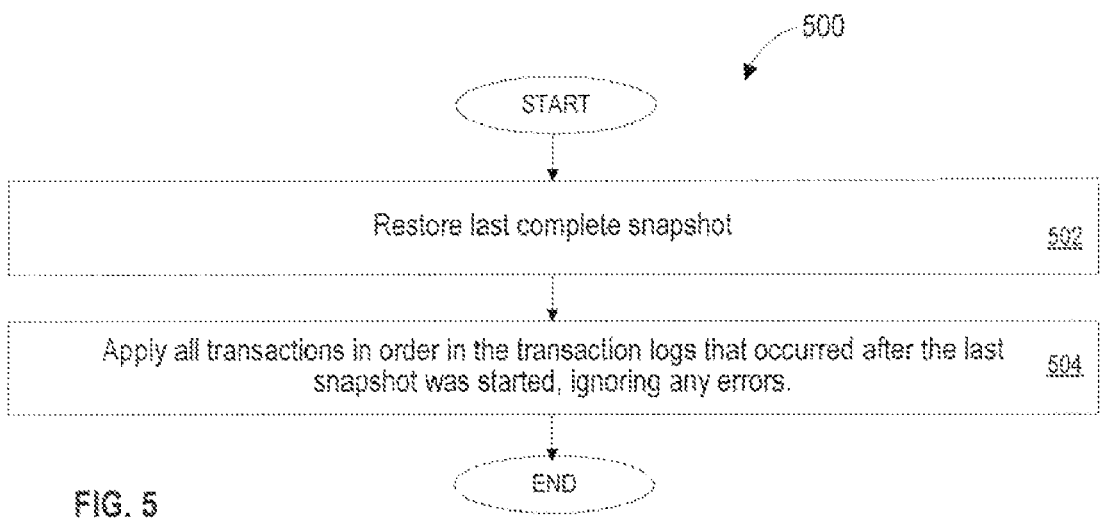
FIG. 5 is a flowchart of a method of restoring a database, in accordance with an embodiment of the present invention.

FIG. 5 is a flowchart of a method 500 of restoring a database, in accordance with an embodiment of the present invention. The method 500 starts in step 502 where the database snapshot device restores the last complete snapshot of the database. Next, in step 504, the database snapshot device applies all transaction in order in the transaction togs that occurred after the last snapshot was started. The database snapshot device ignores all errors. The method 500 is then at an end.

Computer Readable Medium Implementation

Portions of the present invention may be conveniently implemented using a conventional general purpose or a specialized digital computer or microprocessor programmed according to the teachings of the present disclosure, as will be apparent to those skilled in the computer art.

Appropriate software coding can readily be prepared by skilled programmers based on the teachings of the present disclosure, as will be apparent to those skilled in the software art. The invention may also be implemented by the preparation of application specific integrated circuits or by interconnecting an appropriate network of conventional component circuits, as will be readily apparent to those skilled in the art.

The present invention includes a computer program product which is a storage medium (media) having instructions stored thereon/in which can be used to control, or cause, a computer to perform any of the processes of the present invention. The storage medium can include, but is not limited to, any type of disk including floppy disks, mini disks (MD's), optical disks, DVD, CD-ROMS, micro-drive, and magneto-optical disks, ROMs, RAMs, EPROMs, EEPROMs, DRAMs, VRAMs, flash memory devices (including flash cards), magnetic or optical cards, nanosystems (including molecular memory ICs), RAID devices, remote data storage/archive/warehousing, or any type of media or device suitable for storing instructions and/or data.

Stored on any one of the computer readable medium (media), the present invention includes software for controlling both the hardware of the general purpose/specialized computer or microprocessor, and for enabling the computer or microprocessor to interact with a human user or other mechanism utilizing the results of the present invention. Such software may include, but is not limited to, device drivers, operating systems, and user applications. Ultimately, such computer readable media further includes software for performing the present invention, as described above.

Included in the programming (software) of the general/specialized computer or microprocessor are software modules for implementing the teachings of the present invention, including but not limited to starting and maintaining a transaction log of the database, starting and maintaining a fuzzy snapshot of the database without applying any hindering locks to the database, and restoring the database by applying the transaction log to the fuzzy snapshot, according to processes of the present invention.

Advantages

This invention allows the database snapshot device to maintain system performance while the fuzzy snapshot is in process because the database snapshot device does not take any hindering locks during the snapshot. The database snapshot device achieves this functionality with a very simple implementation because the database snapshot device does not have to add new data structures to the database. Nor does the database snapshot device have to add new metadata to the transaction log or fuzzy snapshot.

In the foregoing specification, the invention has been described with reference to specific embodiments thereof. It will, however, be evident that various modifications and changes may be made thereto without departing from the broader spirit and scope of the invention. The specification and drawings are, accordingly, to be regarded in an illustrative rather than a restrictive sense.

What is claimed is:

1. A database snapshot method comprising:
    starting and maintaining, in a computer, a transaction log of the database, wherein transactions in the transaction log are idempotent;
    starting and maintaining, in a computer, a fuzzy snapshot of the database without applying any hindering locks to the database; and
    restoring the database by applying, in a computer, the transaction log to the fuzzy snapshot.

2. The database snapshot method of claim 1, wherein the starting and maintaining of the transaction log includes writing the transaction log to a storage medium, and wherein the starting and maintaining of the fuzzy snapshot includes writing the fuzzy snapshot to a storage medium.

3. The database snapshot method of claim 1, wherein a hindering lock is one of a global lock and a regional lock.

4. The database snapshot method of claim 1, wherein the fuzzy snapshot consists of the database at the start of the fuzzy snapshot with some subset of transactions that occurred to the database while the fuzzy snapshot was in process.

5. The database snapshot method of claim 1, further comprising applying transactions to the database during the starting and maintaining of the fuzzy snapshot.

6. The database snapshot method of claim 1, wherein the starting and maintaining the fuzzy snapshot begins once a threshold number of transactions are in the transaction log.

7. The database snapshot method of claim 6, further comprising:
   applying, in a computer, a particular transaction to a particular database part; and
   applying, in a computer, the particular transaction to the fuzzy snapshot during the restoring of the database.

8. The database snapshot method of claim 7, further comprising writing the fuzzy snapshot, in a computer, on the particular database before applying the particular transaction to the particular database part.

9. The database snapshot method of claim 7, further comprising writing the fuzzy snapshot, in a computer, on the particular database part after applying the particular transaction to the particular database part.

10. The database snapshot method of claim 9, wherein applying the particular transaction to the fuzzy snapshot creates an error because of previously writing the fuzzy snapshot on the particular database part, the database snapshot method further comprising skipping the applying the particular transaction to the fuzzy snapshot.

11. An apparatus comprising:
    a computer, comprising at least one processor and memory, for
       starting and maintaining a transaction log of a database; wherein transactions in the transaction log are idempotent and
       starting and maintaining a fuzzy snapshot of the database without applying any hindering locks to the database, wherein the computer is configured to restore the database by applying the transaction log to the fuzzy snapshot.

12. The apparatus of claim 11, wherein the starting and maintaining of the transaction log includes writing the transaction log, and wherein the starting and maintaining of the fuzzy snapshot includes writing the fuzzy snapshot.

13. The apparatus of claim 11, wherein a hindering lock is one of a global lock and a regional lock.

14. The apparatus of claim 11, wherein the fuzzy snapshot consists of the database at the start of the fuzzy snapshot with some subset of transactions that occurred to the database while the fuzzy snapshot was in process.

15. The apparatus of claim 11, wherein the computer is further configured to apply transactions to the database during starting and maintaining of the fuzzy snapshot.

16. The apparatus of claim 11, wherein the computer is further configured to start and maintain the fuzzy snapshot once a threshold number of transactions are in the transaction log.

17. The apparatus of claim 16, wherein the computer is further configured to apply a particular transaction to a particular database part and apply the particular transaction to the fuzzy snapshot during the restoring of the database.

18. The apparatus of claim 17, wherein the computer is further configured to write the fuzzy snapshot on the particular database before applying the particular transaction to the particular database part.

19. The apparatus of claim 17, wherein the computer is further configured to write the fuzzy snapshot on the particular database part after applying the particular transaction to the particular database part.

20. The apparatus of claim 19, wherein the computer is further configured to create an error upon applying the particular transaction to the fuzzy snapshot because of previously writing the fuzzy snapshot on the particular database part, wherein the database snapshot device is further configured to skip the applying of the particular transaction to the fuzzy snapshot.

21. A computer readable medium storing one or more instructions for taking a snapshot of a database, wherein the one or more instructions, when executed by one or more processors, cause the one or more processors to perform the steps of:
    starting and maintaining, in a computer, a transaction log of the database; wherein transactions in the transaction log are idempotent;
    starting and maintaining, in a computer, a fuzzy snapshot of the database without applying any hindering locks to the database; and
    restoring the database, in a computer, by applying the transaction log to the fuzzy snapshot.

* * * * *